(12) United States Patent
Sakuda et al.

(10) Patent No.: US 9,616,915 B2
(45) Date of Patent: Apr. 11, 2017

(54) STEERING SYSTEM (71) Applicant: JTEKT CORPORATION, Osaka-shi, Osaka (JP)

(72) Inventors: Masayoshi Sakuda, Kashihara (JP); Atsumune Nagatani, Kashihara (JP); Yu Myohoji, Habikino (JP)

(73) Assignee: JTEKT CORPORATION, Osaka-Shi (JP)

( * ) Notice: Subject to any disclaimer, the term of this patent is extended or adjusted under 35 U.S.C. 154(b) by 0 days.

(21) Appl. No.: 15/003,114

(22) Filed: Jan. 21, 2016

(65) Prior Publication Data
US 2016/0214640 A1    Jul. 28, 2016

(30) Foreign Application Priority Data

Jan. 26, 2015   (JP) ................................. 2015-012671

(51) Int. Cl.
*B62D 1/19* (2006.01)
*B62D 1/184* (2006.01)

(52) U.S. Cl.
CPC ............. *B62D 1/192* (2013.01); *B62D 1/184* (2013.01); *B62D 1/195* (2013.01)

(58) Field of Classification Search
CPC ........ B62D 1/192; B62D 1/195; B62D 1/197; B62D 1/19; B62D 1/18; B62D 1/184; B62D 1/185; B62D 1/187; B62D 1/189
USPC ................... 74/493; 280/777, 775
See application file for complete search history.

(56) References Cited

U.S. PATENT DOCUMENTS

| 2011/0210536 A1 | 9/2011 | Monteil et al. | |
| 2016/0144886 A1* | 5/2016 | Tomiyama | B62D 1/187 74/493 |
| 2016/0167691 A1* | 6/2016 | Imagaki | B62D 1/185 280/775 |

FOREIGN PATENT DOCUMENTS

| EP | 2818385 A1 | 12/2014 |
| EP | 2965970 A1 | 1/2016 |

OTHER PUBLICATIONS

Nov. 21, 2016 Search Report issued in European Patent Application No. 16152297.4.

* cited by examiner

*Primary Examiner* — Keith Frisby
(74) *Attorney, Agent, or Firm* — Oliff PLC (57) ABSTRACT A steering system includes an engaged member fixed to an upper jacket, an engaging member rotatably supported by a lower jacket, and an impact absorbing member including a movable portion that moves together with the engaging member at the time of a secondary collision, to absorb impact made at the time of the secondary collision. The engaged member has a plurality of engaged teeth. The engaging member comes into engagement with the engaged teeth in accordance with an operation of an operation member. At the time of the secondary collision, the engaging member is disengaged from the lower jacket, and moves along with the upper jacket while in engagement with the engaged teeth.

5 Claims, 7 Drawing Sheets

STEERING SYSTEM

INCORPORATION BY REFERENCE

The disclosure of Japanese Patent Application No. 2015-012671 filed on Jan. 26, 2015 including the specification, drawings and abstract, is incorporated herein by reference in its entirety.

BACKGROUND OF THE INVENTION

1. Field of the Invention

The present invention relates to a steering system.

2. Description of Related Art

In a steering system described in U.S. Patent Application Publication No. 2011/0210536 (US 2011/0210536 A), teeth of a movable pawl supported by a support assembly fixed to a vehicle body are engaged with recessed portions of a guide piece fixed to a tubular member using a shearing pin. When a vehicle collision occurs, the shearing pin is sheared at the time of a secondary collision where a driver or the like collides against a steering member. Thus, the guide piece is fixed to the support assembly via the movable pawl and does not move along with the tubular member.

In the steering system described in US 2011/0210536 A, an accessory such as a turn switch, a combination switch, or a key lock may be attached to the tubular member.

An impact absorption stroke corresponding to the distance the tubular member moves at the time of the secondary collision is set within a range where the accessory moving together with the tubular member does not interfere with the guide piece or the movable pawl. Thus, the length of the impact absorption stroke may be insufficient.

SUMMARY OF THE INVENTION

An object of the present invention is to provide a steering system that allows a sufficient impact absorption stroke to be obtained at the time of a secondary collision.

A steering system in an aspect of the present invention includes:

a steering member, a steering shaft to which the steering member is coupled and which is extendable and contractible in an axial direction, a column jacket that holds the steering shaft and that has an upper jacket located closer to the steering member and a lower jacket located away from the steering member, the column jacket being extendable and contractible in the axial direction along with the steering shaft as a result of movement of the upper jacket in the axial direction with respect to the lower jacket, a bracket that supports the lower jacket and that is fixable to a vehicle body, an engaged member fixed to the upper jacket and having a plurality of engaged teeth arranged along the axial direction, an engaging member that is rotatably supported by the lower jacket and that comes into engagement with the engaged teeth in accordance with an operation of an operation member, the engaging member configured to be disengaged from the lower jacket at a time of a secondary collision, and an impact absorbing member including a movable portion that moves together with the engaging member at the time of the secondary collision to absorb impact during the secondary collision.

At the time of the secondary collision, the engaging member moves along with the upper jacket while in engagement with the engaged teeth of the engaged member.

In the steering system in this aspect, at the time of the secondary collision, the engaging member is disengaged from the lower jacket and comes into engagement with the engaged teeth of the engaged member, and moves in the axial direction along with the engaged member, the upper jacket, and the movable portion of the impact absorption member while in engagement with the engaged teeth of the engaged member. Consequently, impact made at the time of the secondary collision is absorbed. At the time of the secondary collision, the engaging member and the engaged member are prevented from interfering with an accessory of the upper jacket and the like. Thus, a sufficient impact absorption stroke can be obtained at the time of the secondary collision.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Embodiments of the present invention will be described below in detail with reference to the attached drawings.

Figure 1:
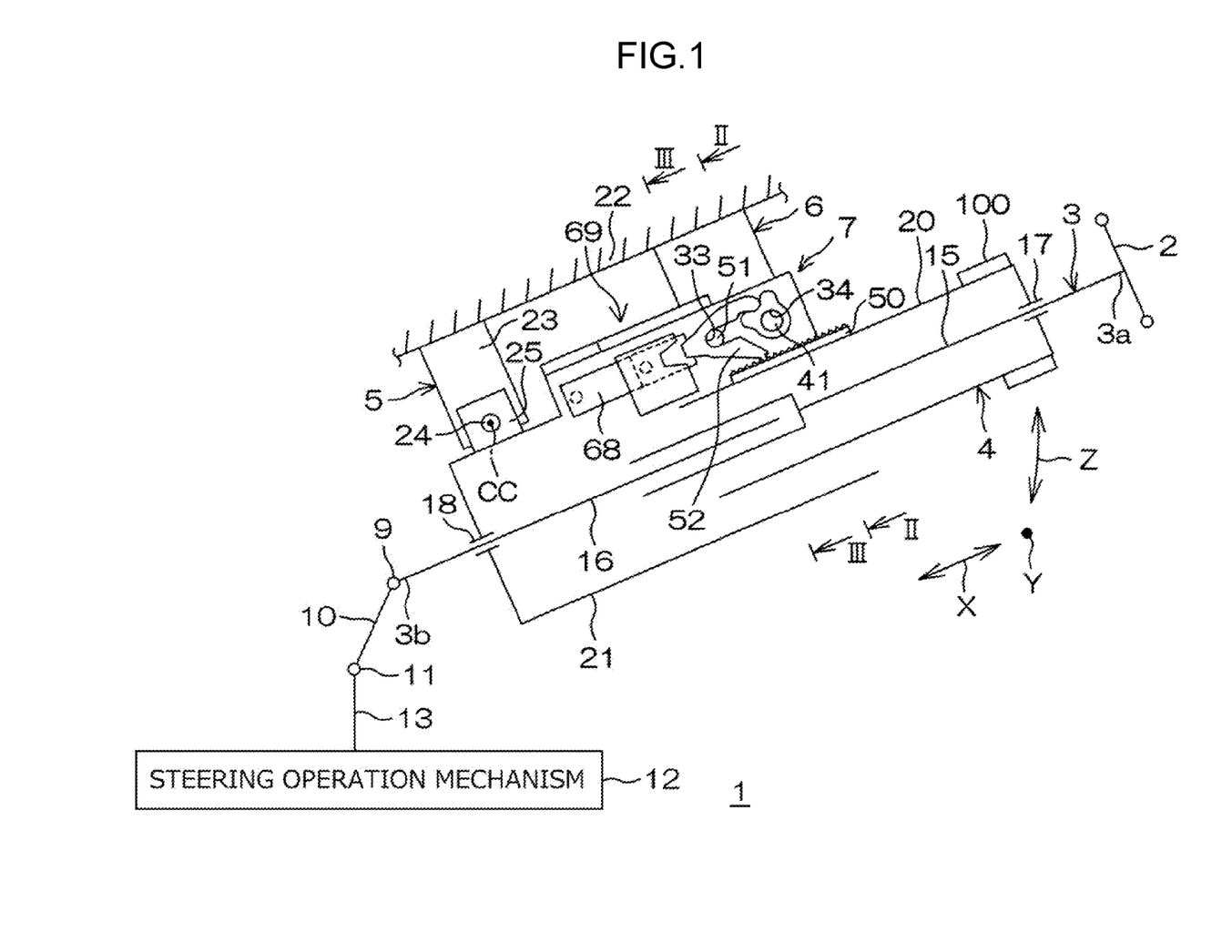
FIG. 1 is a schematic side view of a steering system in a first embodiment of the present invention.

FIG. 1 is a schematic side view of a steering system in a first embodiment of the present invention.

As seen in FIG. 1, a steering system 1 mainly includes a steering shaft 3, a column jacket 4, a lower bracket 5, an upper bracket (bracket) 6, and a lock mechanism 7.

A steering member 2 such as a steering wheel is coupled to an end 3a of the steering shaft 3 in an axial direction X. Another end 3b of the steering shaft 3 is coupled to a pinion shaft 13 of a steering operation mechanism 12 via a universal joint 9, an intermediate shaft 10, and a universal joint 11 in this order.

The steering operation mechanism 12 is, for example, a rack-and-pinion mechanism that steers steered wheels (not depicted in the drawings) in conjunction with an operation of the steering member 2. Rotation of the steering member 2 is transmitted to the steering operation mechanism 12 via the steering shaft 3, the intermediate shaft 10, and the like. The rotation transmitted to the steering operation mechanism 12 is converted into axial movement of a rack shaft not depicted in the drawings. Thus, the steered wheels are steered.

The steering shaft 3 has a tubular upper shaft 15 and a tubular lower shaft 16 fitted to the steering shaft 3, for example, by spline fitting or serration fitting so as to be slidable relative to the steering shaft 3. The steering shaft 3 can extend and contract in the axial direction X.

The steering shaft 3 is inserted through the column jacket 4. The column jacket 4 holds the steering shaft 3 to support the steering shaft 3 via a plurality of bearings such that the steering shaft 3 is rotatable.

The column jacket 4 has a tubular upper jacket 20 that is an inner jacket and a tubular lower jacket 21 that is an outer jacket. The upper jacket 20 is arranged closer to the steering member 2 than the lower jacket 21. The lower jacket 21 is positioned on the opposite side of the upper jacket 20 from the steering member 2. The upper jacket 20 and the lower jacket 21 are fitted together so as to be slidable relative to each other in the axial direction X of the steering shaft 3.

The upper jacket 20 supports the upper shaft 15 via a bearing 17 such that the upper shaft 15 is rotatable. The lower jacket 21 supports the lower shaft 16 via a bearing 18 such that the lower shaft 16 is rotatable. The upper jacket 20 moves in the axial direction X of the steering shaft 3 with respect to the lower jacket 21 to enable the column jacket 4 to extend and contract in the axial direction X along with the steering shaft 3.

The lower bracket 5 includes a fixed bracket 23 fixed to a vehicle body 22, a tilt support shaft 24 supported by the fixed bracket, and a column bracket 25 fixed to an outer periphery of the lower jacket 21 and rotatably supported by the tilt support shaft 24. The column jacket 4 and the steering shaft 3 can be tilted in a tilt direction Z using, as a supporting point, a tilt center CC that is a central axis of the tilt support shaft 24.

The steering shaft 3 and the column jacket 4 are pivoted (tilted) around the tilt center CC to adjust the position of the steering member 2 in the tilt direction Z. Thus, what is called tilt adjustment is performed. The steering shaft 3 and the column jacket 4 are extended and contracted in the axial direction X to adjust the position of the steering member 2 in a telescopic direction (axial direction X). Thus, what is called telescopic adjustment is performed.

An accessory 100 such as a key lock main body, a turn switch, or a combination switch is attached to an outer peripheral surface 20a at a rear end of the upper jacket 20. The accessory 100 has any shape to protrude from the outer peripheral surface 20a. The accessory 100, for example, encloses the rear end of the upper jacket 20 along the entire circumference of the outer peripheral surface 20a. The accessory 100 moves together with the upper jacket 20 during the telescopic adjustment.

Figure 2:
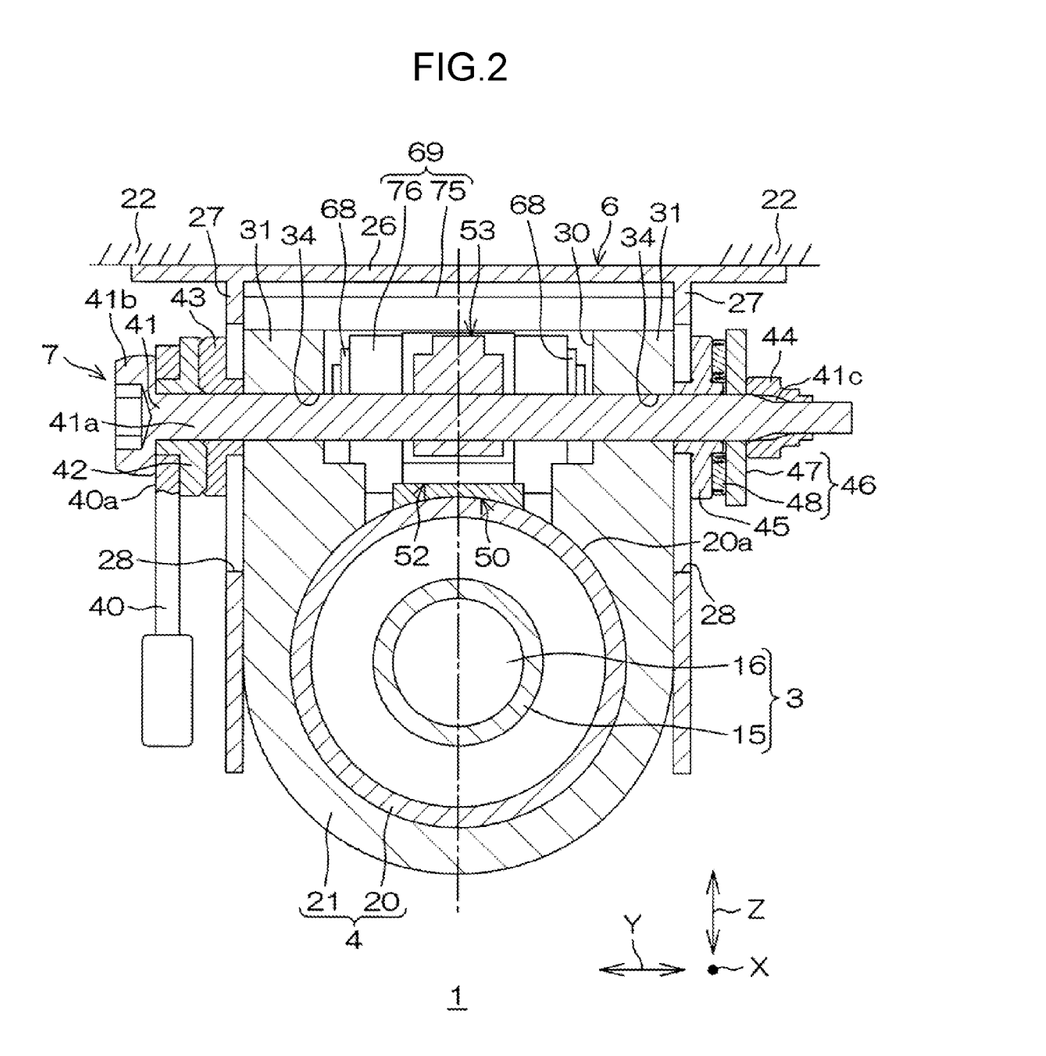
FIG. 2 is a sectional view taken along line II-II in FIG. 1.
Figure 3:
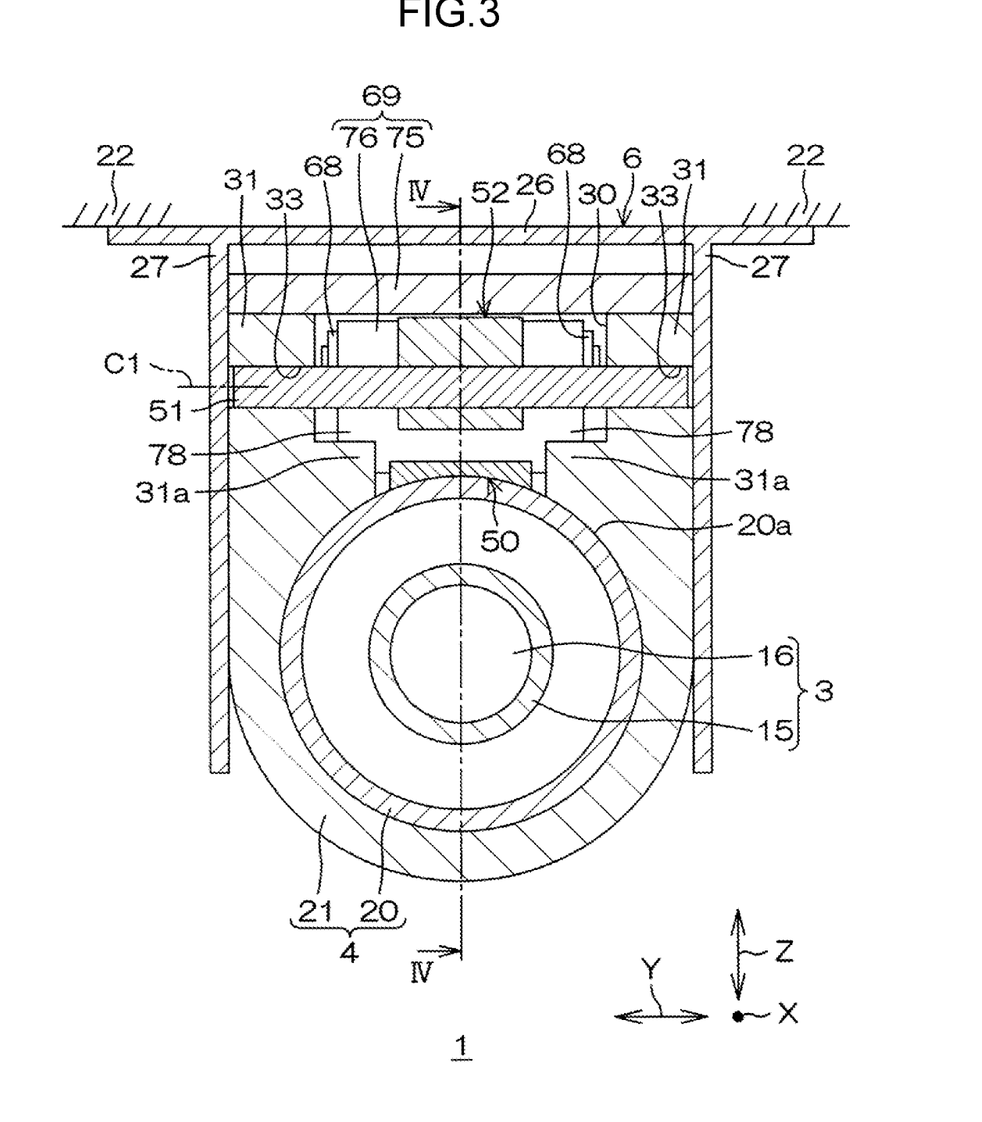
FIG. 3 is a sectional view taken along line III-III in FIG. 1.

FIG. 2 is a sectional view taken along line II-II in FIG. 1. FIG. 3 is a sectional view taken along line III-III in FIG. 1.

As seen in FIG. 2, the upper bracket 6 is adapted to support the lower jacket 21. The upper bracket 6 includes a top plate 26 fixed to the vehicle body 22 via bolts not depicted in the drawings and a pair of side plates 27 extending downward from the top plate 26 in the tilt direction Z. A tilting long groove 28 extending in the tilt direction Z is formed in each of the side plates 27.

On an upper side of the lower jacket 21 at a first end thereof in the tilt direction Z, a slit 30 extends in the axial direction X is formed by cutting out this end of the lower jacket 21. The slit 30 is exposed upward and downward in the axial direction X and upward in the tilt direction Z toward the exterior of the lower jacket 21.

At the first end (the upper end in the axial direction X) of the lower jacket 21, a pair of support portions 31 is integrally provided which extends in the tilt direction Z while defining the slit 30 in an orthogonal direction Y orthogonal to the axial direction X and the tilt direction Z.

The support portions 31 extend upward from the first end of the lower jacket 21 in the tilt direction Z. The support portions 31 face each other across the slit in the orthogonal direction Y. In each of the support portions 31, at the same position as viewed in the orthogonal direction Y, a first support hole 33 is formed which penetrates the support portion 31 in the orthogonal direction Y (see FIG. 3).

In each of the support portions 31, at the same position as viewed in the orthogonal direction Y, a second support hole 34 is formed which penetrates the support portion 31 in the orthogonal direction Y. The second support hole 34 and the first support hole 33 are separated away from each other in the axial direction X (see FIG. 1).

The lock mechanism 7 includes an operation member 40 manually operated by a driver or the like, a rotating shaft 41 to which the operation member 40 is attached at one end of the rotating shaft 41, a rotating cam 42 that rotates together with the operation member 40, and a first clamping member 43 that is a non-rotating cam that cam-engages with the rotating cam 42.

The rotating shaft 41 is a bolt having a shaft portion 41a extending in the orthogonal direction Y, a head portion 41b provided at one end of the shaft portion 41a, and a threaded portion 41c formed at the other end of the shaft portion 41a. The rotating shaft 41 passes through the pair of long grooves 28 and the pair of second support holes 34. The rotating shaft 41 is rotatably supported by the lower jacket 21 via the support portions 31.

A base end 40a that is an end of the operation member 40 in a longitudinal direction thereof, the rotating cam 42, and the first clamping member 43 are interposed between the head portion 41b of the rotating shaft 41 and a first side plate 27. The rotating cam 42 and the first clamping member 43 are supported by the shaft portion 41a near the head portion 41b of the rotating shaft 41. For the rotating cam 42, movement in an axial direction with respect to the rotating shaft 41 (corresponding to the orthogonal direction Y) is regulated. The first clamping member 43 is movable in an axial direction of the rotating shaft 41.

The lock mechanism 7 includes a nut 44 engaged with the threaded portion 41c of the rotating shaft 41, a second clamping member 45 interposed between a second side plate 27 and the nut 44, and an interposition member 46 interposed between the second clamping member 45 and the nut 44.

The second clamping member 45 and the interposition member 46 are supported by the shaft portion 41a of the rotating shaft 41 near the nut 44 so as to be movable in the axial direction of the rotating shaft 41 (corresponding to the orthogonal direction Y). The interposition member 46 includes a washer 47 interposed between the nut 44 and the second clamping member 45 and a needle roller bearing 48 interposed between the washer 47 and the second clamping member 45.

As a result of an operation of rotating the operation member 40 in a lock direction, the rotating cam 42 rotates with respect to the non-rotating cam (first clamping member 43). Then, the first clamping member 43 is moved in the axial direction of the rotating shaft 41 to sandwich both side plates 27 of the upper bracket 6 between the first clamping member 43 and the second clamping member 45. The support portions 31 are clamped by the side plates 27.

Thus, the slit 30 between the support portions 31 is narrowed so as to reduce the lower jacket 21 in diameter. The lower jacket 21 is brought into pressure contact with the upper jacket 20 to achieve tilt lock and telescopic lock. The tilt lock refers to fixation of the position of the steering member 2 following tilt adjustment. The telescopic lock refers to fixation of the position of the steering member 2 following telescopic adjustment.

Figure 4:
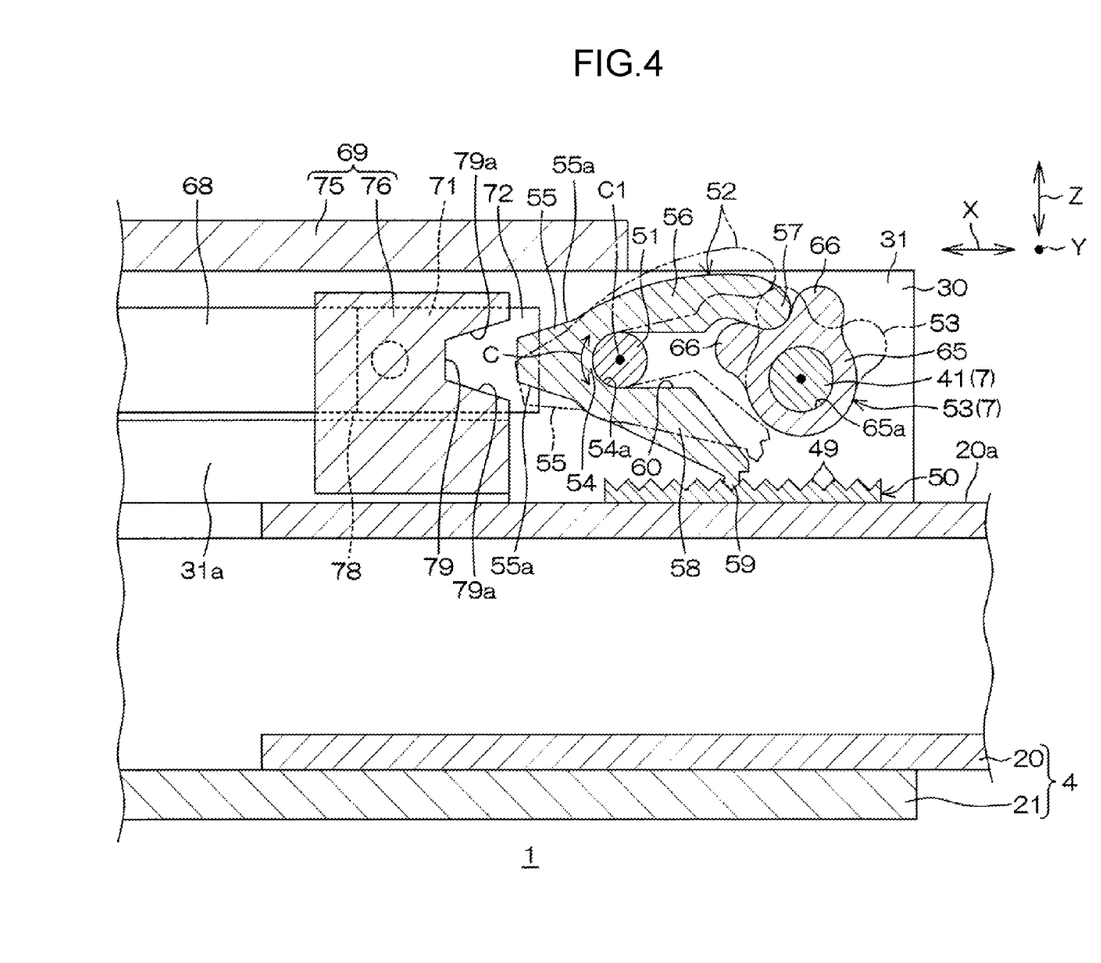
FIG. 4 is a sectional view taken along line IV-IV in FIG. 3.

FIG. 4 is a sectional view taken along line IV-IV in FIG. 3. In FIG. 4, illustration of the steering shaft 3 (see FIG. 3) is omitted, and sections of an engaging member 52 and a block member 76 described later are depicted without hatching, for convenience of description (this also applies to FIG. 6).

As seen in FIG. 4, the steering system 1 includes an engaged member 50 with a plurality of engaged teeth arranged in the axial direction X, a support shaft 51 supported by the support portions 31 of the lower jacket 21, and an engaging member 52 that comes into engagement with the engaged teeth 49 in accordance with the operation of the operation member 40. The steering system 1 also includes a transmission member 53 that transmits rotation of the rotating shaft 41 to the engaging member 52.

The engaged member 50 is fixed to the upper jacket 20. Specifically, the engaged member 50 is fixed to the upper jacket 20 by being joined to the outer peripheral surface 20a of the upper jacket 20 by welding or the like. The engaged member 50 may be fixed to the upper jacket 20 via a pin or the like press-fitted in the engaged member 50 and a peripheral wall of the upper jacket 20 so as to bridge the engaged member 50 and the upper jacket 20. Alternatively, the engaged member 50 may be fixed to the upper jacket 20 by being fastened to the peripheral wall of the upper jacket 20 using screws.

The engaged teeth 49 are, for example, streak-like teeth each protruding outward in a radial direction of the upper jacket 20 to extend in the orthogonal direction Y. The engaged teeth 49 may include a plurality of slots arranged at regular intervals in the axial direction X so as to extend in the orthogonal direction Y and a plurality of ribs located adjacently to one another and above and below the respective slots in the axial direction so as to define the slots. The engaged member 50 may be formed of the same material as that of the upper jacket 20 integrally with the upper jacket 20. That is, the engaged teeth 49 may be formed on the peripheral wall of the upper jacket 20.

As seen in FIG. 3, the support shaft 51 extends in the orthogonal direction Y. The support shaft 51 passes through the pair of first support holes 33 and thus is supported by the first support holes 33. The support shaft 51 may rotate in the first support holes 33 around a central axis C1 extending along the orthogonal direction Y or may be press-fitted in the first support holes 33 so as to be non-rotatable.

As seen in FIG. 4, the engaging member 52 has a fitting hole 54a that is fitted to the support shaft 51 over at least a part of an outer circumference of the support shaft 51 (for example, halfway or more around the outer circumference) and includes an enclosing position 54 that encloses the support shaft 51 and a fitted portion 55 protruding downward from the enclosing portion 54 in the axial direction X.

The engaging member 52 includes a receiving portion 57 that is provided at a tip of a first arm portion 56 extending upward from the enclosing portion 54 in the axial direction X and to which rotation of the rotating shaft 41 is transmitted by a transmission member 53 and engaging tooth 59 that are provided at a tip of a second arm portion 58 extending upward from the enclosing portion 54 in the axial direction X and that engages with the engaged teeth 49.

The enclosing portion 54, the fitted portion 55, the first arm portion 56, the receiving portion 57, the second arm portion 58, and the engaging tooth 59 are integrally formed of a single member.

The fitted portion 55 includes a pair of fitted surfaces 55a that is a pair of tapered surfaces with a distance between the surfaces decreasing downward in the axial direction X. The fitted surfaces 55a are tapered surfaces in the first embodiment, but may be flat surfaces parallel to the axial direction X.

The first arm portion 56 and the second arm portion 58 define, between the arm portions 56 and 58, an open groove 60 that opens the fitting hole 54a upward in the axial direction X. With the support shaft 51 passing through the fitting hole 54a, the engaging member 52 is rotatably supported by the support portion 31 of the lower jacket 21.

When the support shaft 51 rotates around the central axis C1, the engaging member 52 rotates together with the support shaft 51. When the support shaft 51 is fitted in the first support holes 33 so as to be non-rotatable, the engaging member 52 rotates relative to the support shaft 51. The engaging member 52 may be biased toward the engaged member 50 by a bias member such as a spring (not depicted in the drawings). At the time of a secondary collision, the support shaft 51 is disengaged and shifted from the fitting hole 54a to the open groove 60 to enable the engaging member 52 to be disengaged downward from the lower jacket 21 in the axial direction X (see FIG. 6 described below). Furthermore, at the time of the secondary collision, the support shaft 51 may be sheared, and the engaging member 52 may be disengaged from the lower jacket 21 along with the sheared portion of the support shaft 51.

Between the support shaft 51 and the engaging member 52, a support member (not depicted in the drawings) may be interposed which is supported by the outer periphery of the support shaft 51 and which supports the engaging member 52 and which is broken by impact made at the time of the secondary collision. The support member is broken at the time of the secondary collision to permit the engaging member 52 to be disengaged from the support shaft 51.

The transmission member 53 integrally includes a tubular portion 65 with an insertion hole 65a and a pair of transmission portions 66 protruding outward from the tubular portion 65 in a radial direction thereof. The transmission portions 66 are separated from each other in a circumferential direction of the tubular portion 65. A part of the rotating shaft 41 that is exposed in the slit 30 is inserted through the insertion hole 65a (see FIG. 2). Thus, the transmission member 53 is supported by the rotating shaft 41 so as to rotate together with the rotating shaft 41. The transmission member 53 is fixed to the rotating shaft 41 so as to position the receiving portion 57 of the engaging member 52 between the transmission portions 66.

When the transmission member 53 rotates along with the rotating shaft 41 as a result of the operation of rotating the operation member 40 (see FIG. 2) in the lock direction, rotation of the rotating shaft 41 is transmitted from a first transmission portion 66 of the transmission member 53 to the receiving portion 57 of the engaging member 52. The engaging member 52 rotates around the support shaft 51, and thus, the rotation of the rotating shaft 41 transmitted from the first transmission portion 66 is converted into rotation along a circumferential direction C of the support shaft 51. The operation of rotating the operation member 40 in the lock direction allows the rotating shaft 41 to rotate until the engaging tooth 59 of the engaging member 52 finally comes into engagement with any one of the engaged teeth 49 of the engaged member 50.

In contrast, when an operation of rotating the operation member 40 in an unlock direction (a direction opposite to the lock direction) is performed, rotation of the rotating shaft 41 is transmitted from a second transmission portion 66 of the transmission member 53 to the receiving portion 57 of the engaging member 52. Thus, the engaging member 52 rotates in a direction opposite to the above-described direction along the circumferential direction C. The operation of rotating the operation member 40 in the unlock direction allows the rotating shaft 41 to rotate until the engaging tooth 59 of the engaging member 52 is finally disengaged from the engaged tooth 49 of the engaged member 50 (see a long dashed double-short dashed line in FIG. 4).

Figure 5:
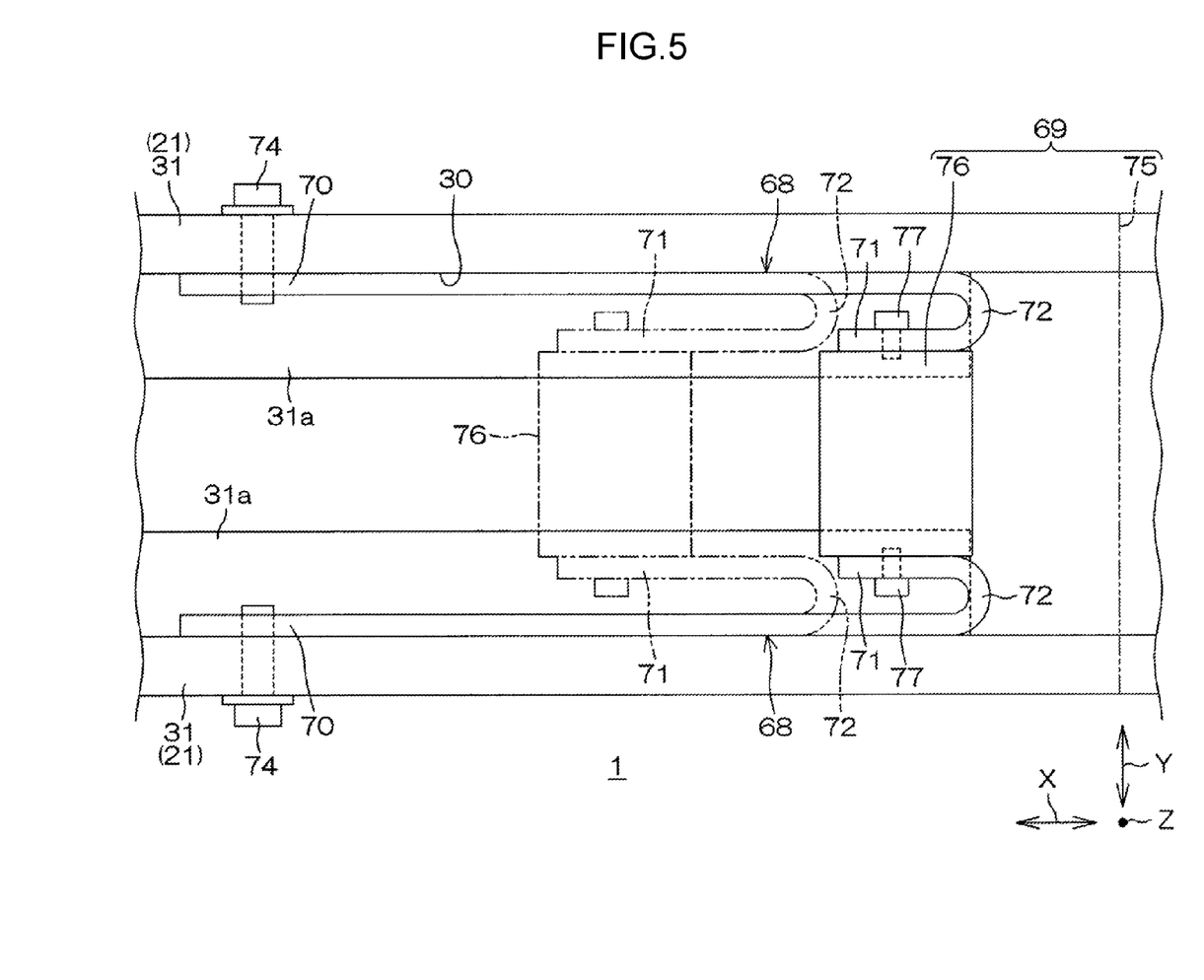
FIG. 5 is a top view of a periphery of an impact absorbing member.

FIG. 5 is a top view of a periphery of an impact absorbing member 68. In FIG. 5, illustration of the upper bracket 6 is omitted for convenience of description.

As seen in FIG. 5, the steering system 1 includes a pair of the impact absorbing members 68 that absorbs impact made at the time of the secondary collision and a position holding mechanism 69 that holds the engaging member 52, which is moved at the time of the secondary collision, in a position (engaged position) in which the engaging member 52 comes into engagement with any of the engaged teeth 49 of the engaged member 50.

Each of the impact absorbing members 68 may be formed, for example, by machining one rectangular metal plate. The impact absorbing member 68 includes a restrained portion 70 provided at one end of the impact absorbing member 68 such that the position of the restrained portion 70 in the axial direction X is restrained at the time of the secondary collision, and a movable portion 71 provided at the other end of the impact absorbing member 68 so as to move together with the engaging member 52 in the axial direction X at the time of the secondary collision. The impact absorbing member 68 includes a folded portion 72 folded between the restrained portion 70 and the movable portion 71. The restrained portion 70, the movable portion 71, and the folded portion 72 are integrally formed of a single member.

Each of the restrained portions 70 is fixed to the corresponding support portion 31, for example, via the metal pin 74. Unlike in the first embodiment, the restrained portion 70 may be fixed to the corresponding support portion 31 by being fitted into a cutout formed in the support portion 31.

In a state before the secondary collision, the position holding mechanism 69 is arranged away from the engaging member 52. The position holding mechanism 69 includes a plate-like guide member 75 extending parallel to the engaged member 50 and a block member 76 that is, for example, formed of resin or metal and shaped generally like a rectangular parallelepiped. In FIG. 5, the guide member 75 is depicted by a long dashed double-short dashed line for convenience of description. The guide member 75 extends between the support portions 31 (see FIG. 3). Unlike in the first embodiment, one guide member 75 may be provided on each of the support portions 31. In this case, each of the guide members 75 only needs to extend to a position where the guide member 75 faces the engaging member 52 in the tilt direction Z.

The block member 76 is fixed to the movable portion 71 via metal pins 77 or the like. The block member 76 is a portion that moves along with the movable portions 71 of the impact absorbing members 68 at the time of the secondary collision. The block member 76 includes a guide portion 78 that guides the impact absorbing member 68 at the time of the secondary collision and a fitting portion 79 that is fitted into the fitted portion 55 at the time of the secondary collision.

As seen in FIG. 3, on the block member 76, a step is formed which narrows the block member 76 in the orthogonal direction Y at a position closer to the lower end of the block member 76 in the tilt direction Z. The guide portion 78 is formed of the step. The guide portion 78 comes into engagement with ribs 31a protruding from the support portions 31 in the orthogonal direction Y so as to narrow the slit 30. In this state, the block member 76 is movable in the axial direction X along the ribs 31a.

As seen in FIG. 4, the fitting portion 79 is a recess formed by recessing an upper surface of the position holding mechanism 69 downward in the axial direction X. The fitting portion 79 includes a pair of fitting surfaces 79a facing each other in the tilt direction Z and a bottom surface that couples lower ends of the fitting surfaces 79a in the axial direction X. The fitting surfaces 79a are tapered surfaces with a distance between the surfaces decreasing downward in the axial direction X. The fitting surfaces 79a are tapered surface in the first embodiment but may be flat surfaces parallel to the axial direction X.

At the time of the secondary collision, the fitted surfaces 55a of the fitted portion 55 of the engaging member 52 come into surface contact with the corresponding fitting surfaces 79a. Thus, the movement of the engaging member 52 in the tilt direction Z is regulated, so that the engaging member 52 is held in the position (engaged position) where the engaging member 52 engages with any of the engaged teeth 49 of the engaged member 50.

Now, operations of the steering system 1 at the time of the secondary collision will be described. The operations will be described below with reference to FIG. 6 depicting the engaging member 52 fitted and held in the fitting portion 79 at the time of the secondary collision.

At the time of the secondary collision, a load from the steering member 2 (see FIG. 1) is transmitted to the upper jacket 20. This causes the upper jacket 20 to move in a direction opposite to the steering member 2 along the axial direction X and the engaged member 50 fixed to the upper jacket 20 to move along with the upper jacket 20. When the vehicle is driven, the position of the steering member 2 is normally locked, and thus, the engaging member 52 is engaged with the engaged member 50. Thus, the engaging member 52 is disengaged from the support shaft 51 as a result of transmission of impact made by the secondary collision from the engaged member 50 to the engaging member 52.

At the time of the secondary collision, the engaged member 50 moves downward in the axial direction X to allow the guide member 75 and the engaged member 50 to face each other in the tilt direction Z. In this state, between the engaged member 50 and the guide member 75, a guide space 80 is defined through which movement of the engaging member 52 in the axial direction X is guided at the time of the secondary collision. Consequently, movement of the engaging member 52 in the tilt direction Z is regulated in the guide space 80, allowing the engaging member 52 to move in the axial direction X along with the upper jacket 20 while in engagement with any of the engaged teeth 49 of the engaged member 50.

Figure 6:
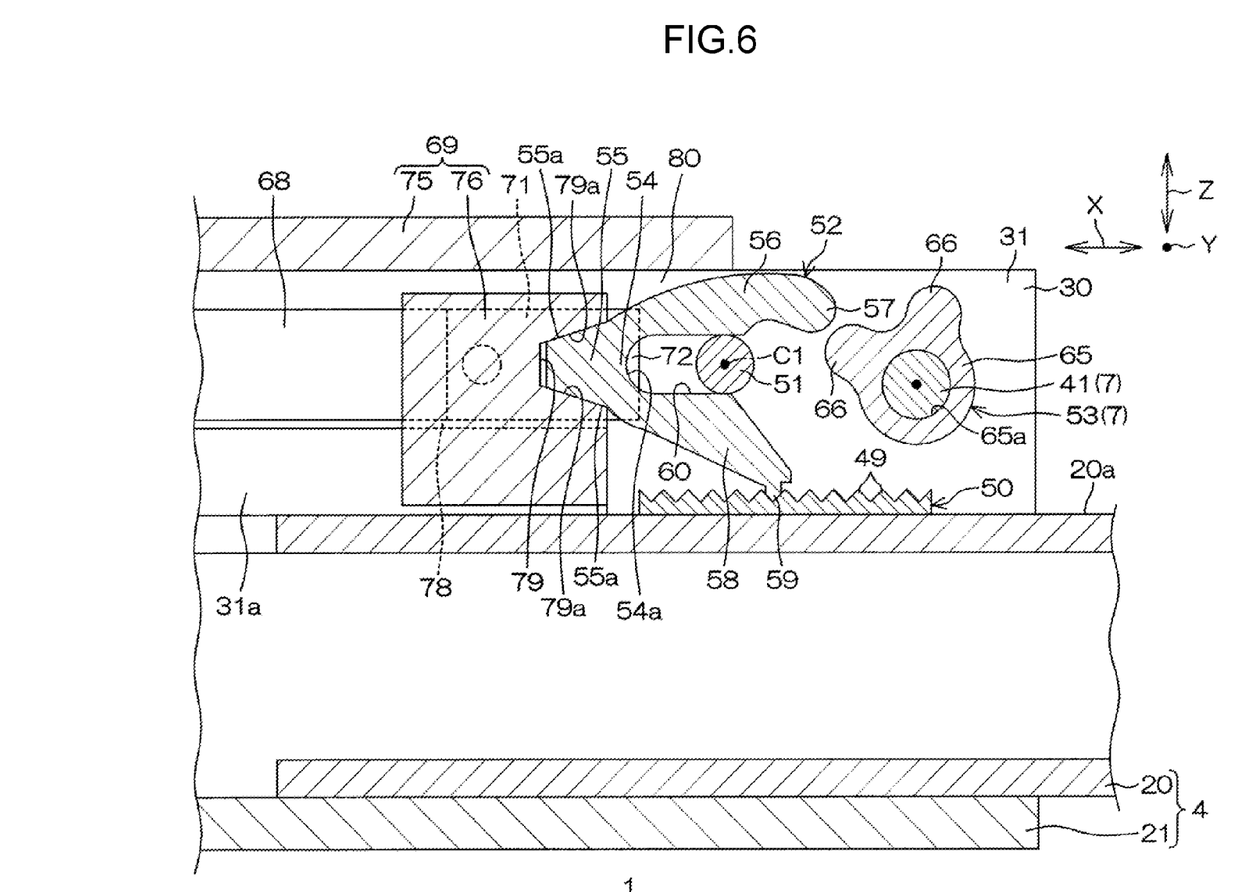
FIG. 6 is a diagram depicting an engaging member fitted and held in a fitting portion in a secondary collision.

On the other hand, as depicted in FIG. 6, the engaging member 52 moves downward in the axial direction X to allow the fitted portion 55 of the engaging member 52 to be fitted and held in the fitting portion 79 of the block member 76. Consequently, the engaging member 52 is held in the engaged position, allowing the engaging member 52 to move in the axial direction X along with the upper jacket 20 while in engagement with any of the engaged teeth 49 of the engaged member 50.

The engaging member 52 is fitted to and held by the block member 76 so that impact is transmitted from the engaging member 52 to the block member 76. Therefore, the movable portions 71 of the impact absorbing members 68 to which the block member 76 is fixed move downward in the axial direction X together with the engaging member 52. Consequently, as depicted by the long dashed double-short dashed line in FIG. 5, the impact absorbing member 68 is deformed so as to move the position of the folded portion 72 to absorb the impact made at the time of the secondary collision.

Now, a comparative example is assumed where, at the time of a secondary collision, the engaging member is not disengaged from the lower jacket, whereas the engaged member is disengaged from the upper jacket. In the steering system of the comparative example, the engaged member and the impact absorbing member are integrally provided.

For the steering system in the comparative example, at the time of the secondary collision, the engaged member may collide against an accessory (a turn switch, a combination switch, a key lock, or the like) fixed to the upper jacket 20 because the engaged member is engaged with the engaging member to fix the position of the engaged member in the axial direction. Therefore, in the steering system in the conventional example, movement of the upper jacket may be insufficient, precluding sufficient absorption of impact at the time of the secondary collision.

The engaged member may hold on during the collision against the accessory to stop the movement of the upper jacket or the collision against the accessory may prevent the engaged member from appropriately receiving a load. This may make behavior of the engaged member unpredictable. Thus, in the steering system in the comparative example, the absorption of the impact may be unstable at the time of the secondary collision.

In the comparative example, the engaged member and the impact absorbing member are integrally provided. Thus, when material, hardness, plate thickness, and the like are changed to adjust the amount of impact absorbed at the time of the secondary collision, the strength of the engagement between any of the engaged teeth of the engaged member and the engaging member is affected. Therefore, in the steering system in the comparative example, adjustment of the absorbed load of the impact made at the time of the secondary collision has a low degree of freedom.

As seen in FIG. 6, at the time of the secondary collision, the engaging member 52 is disengaged from the lower jacket 21 and moves in the axial direction X along with the engaged member 50, the upper jacket 20, and the movable portions 71 of the impact absorbing members 68 while in engagement with any of the engaged teeth 49 of the engaged member 50 according to the first embodiment. Thus, the impact made at the time of the secondary collision is absorbed. At the time of the secondary collision, the engaging member 52 and the engaged member 50 move in the axial direction X along with the upper jacket 20 and are thus prevented from interfering with the accessory 100 (see FIG. 1). Therefore, a sufficient amount of impact absorption stroke can be obtained at the time of the secondary collision.

Since the engaged member 50 does not interfere with the accessory 100 (see FIG. 1) at the time of the secondary collision, the impact made at the time of the secondary collision is stably absorbed.

Unlike in the comparative example, the impact absorbing member 68 and the engaged member 50 are provided as separate components. Thus, the absorbed load of the impact made at the time of the secondary collision can be adjusted without affecting the strength of the engagement between the engaging member 52 and the engaged member 50.

The engaging member 52 is reliably held by the position holding mechanism 69 while in engagement with any of the engaged teeth 49 at the time of the secondary collision. Thus, the impact made at the time of the secondary collision is stably absorbed.

Movement of the engaging member 52 is guided through the guide space 80 while the engaging member 52 in engagement with any of the engaged teeth 49. Consequently, the impact made at the time of the secondary collision is more stably absorbed.

The fitted portion 55 of the engaging member 52 is fitted into the fitting portion 79 and thus the engaging member 52 is held in the engaged position at the time of the secondary collision. Accordingly, the impact made at the time of the secondary collision is further stably absorbed.

The position holding mechanism 69 and the impact absorbing member 68 can be designed regardless of the rotating operation of the engaging member 52 before the secondary collision. Thus, the structures of the position holding mechanism 69 and the impact absorbing member 68 can be simplified.

Downward movement of the block member 76 in the axial direction X is guided by the engagement between the guide portion 78 of the block member 76 and the ribs 31a of the support portions 31. Consequently, the impact made at the time of the secondary collision is more stably absorbed.

Figure 7:
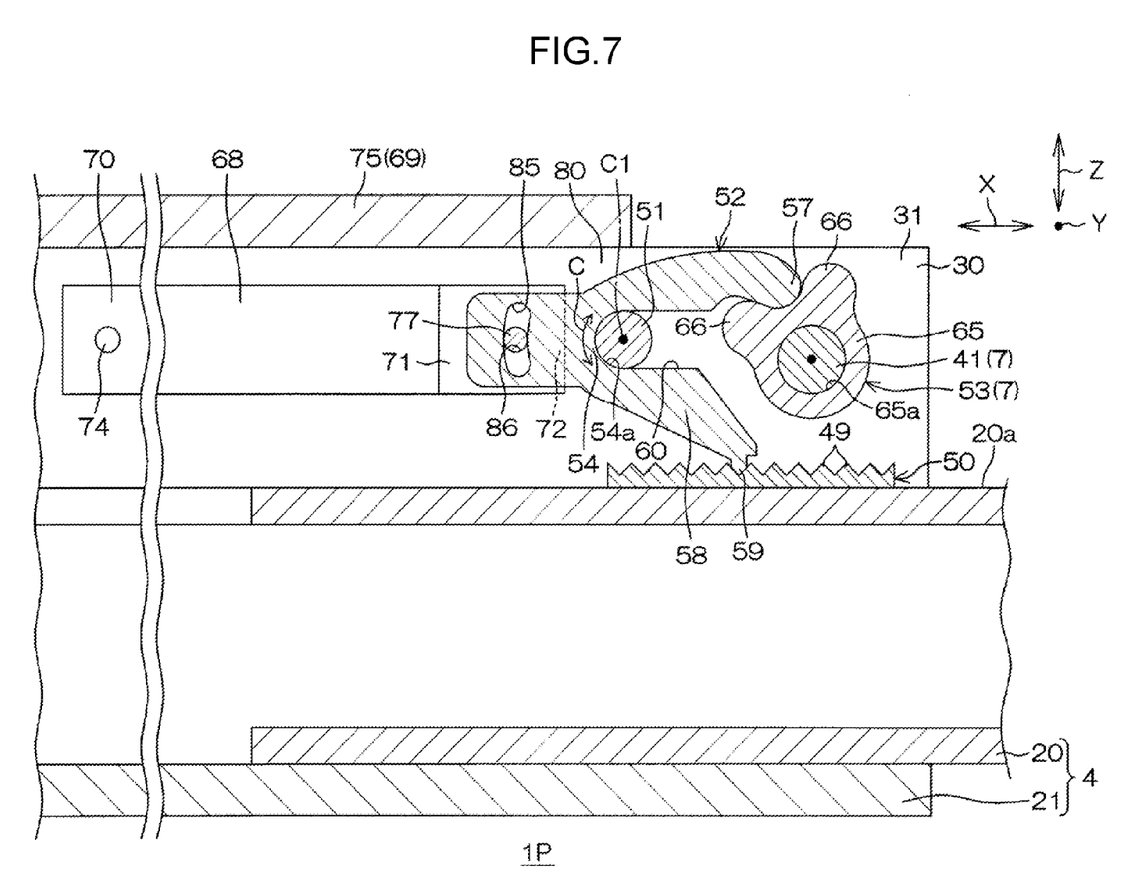
FIG. 7 is a sectional view depicting an important part of a second embodiment.

FIG. 7 is a sectional view depicting an important part of a second embodiment. In FIG. 7, members of the second embodiment that are similar to the above-described members are denoted by the same reference numerals and will not be described.

As seen in FIG. 7, a steering system 1P in the second embodiment is different from the steering system 1 in the first embodiment in that the position holding mechanism 69 does not include the block member 76 and in that the pair of support portions 31 does not include the ribs 31a.

The movable portions 71 of the impact absorbing members 68 in the second embodiment are attached to the fitted portion 55 of the engaging member 52. Specifically, in the fitted portion 55, a slot 85 is formed which extends along the circumferential direction C of the support shaft 51. In the movable portion 71, a hole 86 is formed which has substantially the same diameter as that of the pin 77. The pin 77 is inserted both through the hole 86 and through the slot 85. Thus, when the engaging member 52 rotates along the circumferential direction C in accordance with the operation of the operation member 40, the pin 77 moves through the slot 85 along the circumferential direction C relative to engaging member 52.

At the time of a secondary collision, the engaged member 50 moves downward in the axial direction X to allow the guide space 80 where movement of the engaging member 52 in the axial direction X is guided at the time of the secondary collision to be defined between the engaged member 50 and the guide member 75 in the tilt direction Z. Thus, movement of the engaging member 52 in the tilt direction Z in the guide space 80 is regulated. Furthermore, the movable portions 71 of the impact absorbing members 68 are fixed to the fitted portion 55 of the engaging member 52. Consequently, the engaging member 52 moves downward in the axial direction X along with each of the movable portions 71 while in engagement with any of the engaged teeth 49 of the engaged member 50. Thus, the impact absorbing member 68 is deformed so as to move the position of the folded portion 72, allowing the impact made at the time of the secondary collision to be absorbed.

According to the second embodiment, the engaging member 52 is disengaged from the lower jacket 21 and moves in the axial direction X along with the engaged member 50, the upper jacket 20, and the movable portions 71 of the impact absorbing members 68 while in engagement with any of the engaged teeth 49 of the engaged member 50. Thus, the impact made at the time of the secondary collision is absorbed. At the time of the secondary collision, the engaging member 52 and the engaged member 50 move in the axial direction X along with the upper jacket 20 and are thus prevented from interfering with the accessory 100. Therefore, a sufficient amount of impact absorption stroke can be obtained at the time of the secondary collision.

Since the engaged member 50 does not interfere with the accessory 100 at the time of the secondary collision, the impact made at the time of the secondary collision is stably absorbed.

The impact absorbing member 68 and the engaged member 50 are provided as separate components. Thus, the absorbed load of the impact made at the time of the secondary collision can be adjusted without affecting the strength of the engagement between the engaging member 52 and the engaged member 50.

The engaging member 52 is reliably held by the position holding mechanism 69 while in engagement with any of the engaged teeth 49 at the time of the secondary collision. Thus, the impact made at the time of the secondary collision is stably absorbed.

Movement of the engaging member 52 is guided through the guide space 80 while the engaging member 52 in engagement with any of the engaged teeth 49. Consequently, the impact made at the time of the secondary collision is more stably absorbed.

The present invention is not limited to the above-described embodiments, and various modifications may be made to the embodiments.

For example, unlike in the first embodiment, the fitting portion 79 may be formed in the movable portions 71 of the impact absorbing members 68. In this case, unlike in the first embodiment, the block member 76 may be omitted.

Unlike in the second embodiment, the slot 85 may be formed in the movable portion 71, whereas the hole 86 may be formed in the fitted portion 55.

Unlike in the second embodiment, the movable portions 71 may be fixed to the fitted portion 55. In this case, clearance is provided between the restrained portion 70 and the support portions 31 in the circumferential direction to permit the engaging member 52 to rotate in accordance with the operation of the operation member 40.

The impact absorbing member 68 need not necessarily include the folded portion 72 and the restrained portion 70. That is, the impact absorbing member 68 only needs to be configured such that, at the time of the secondary collision, the movable portion 71 moves in the axial direction X to, for example, bend, tear, compress, shear, or pull out the impact absorbing member 68, thus allowing the impact made at the time of the secondary collision to be absorbed.

The steering systems 1 and 1P are so-called upper lever-type steering systems in which the base end 40a of the operation member 40 is arranged above the upper jacket 20 in the tilt direction Z. However, the present invention may be applied to a so-called lower lever-type steering system in which the base end 40a of the operation member 40 is arranged below the upper jacket 20 in the tilt direction Z.

The steering system 1 is not limited to a manual steering system in which steering of the steering member 2 is not assisted, but may be a column-assist electric power steering system (C-EPS) in which the steering of the steering member 2 is assisted by an electric motor.

What is claimed is:

1. A steering system comprising:
   a steering member,
   a steering shaft to which the steering member is coupled and which is extendable and contractible in an axial direction,
   a column jacket that holds the steering shaft and that has an upper jacket located closer to the steering member and a lower jacket located away from the steering member, the column jacket being extendable and contractible in the axial direction along with the steering shaft as a result of movement of the upper jacket in the axial direction with respect to the lower jacket,
   a bracket that supports the lower jacket and that is fixable to a vehicle body,
   an engaged member fixed to the upper jacket and having a plurality of engaged teeth arranged along the axial direction,
   an engaging member that is rotatably supported by the lower jacket and that comes into engagement with the engaged teeth in accordance with an operation of an operation member, the engaging member configured to be disengaged from the lower jacket at a time of a secondary collision, and
   an impact absorbing member including a movable portion that moves together with the engaging member at the time of the secondary collision to absorb impact during the secondary collision; wherein
   at the time of the secondary collision, the engaging member moves along with the upper jacket while in engagement with the engaged teeth of the engaged member.

2. The steering system according to claim 1, further comprising:
   a position holding mechanism that holds the engaging member moving, in an engaged position in which the engaging member is engaged with the engaged teeth at the time of the secondary collision.

3. The steering system according to claim 2, wherein
   the position holding mechanism includes a guide member extending parallel to the engaged member, and
   between the engaged member and the guide member, a guide space is defined through which movement of the engaging member is guided at the time of the secondary collision.

4. The steering system according to claim 2, wherein
   the position holding mechanism includes a fitting portion which is provided in the movable portion or a portion moving together with the movable portion and in which the engaging member is fitted and held in the engaged position at the time of the secondary collision.

5. The steering system according to claim 2, wherein
   before the secondary collision, the position holding mechanism and the engaging member are separated from each other.

* * * * *